United States Patent
Planche et al.

(10) Patent No.: US 11,809,484 B2
(45) Date of Patent: Nov. 7, 2023

(54) TRAINING OF DIFFERENTIABLE RENDERER AND NEURAL NETWORK FOR QUERY OF 3D MODEL DATABASE

(71) Applicant: Siemens Industry Software Inc., Plano, TX (US)

(72) Inventors: Benjamin Planche, New Brunswick, NJ (US); Rajat Vikram Singh, Santa Clara, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/905,260

(22) PCT Filed: Aug. 28, 2020

(86) PCT No.: PCT/US2020/048309
§ 371 (c)(1),
(2) Date: Aug. 30, 2022

(87) PCT Pub. No.: WO2021/178000
PCT Pub. Date: Sep. 10, 2021

(65) Prior Publication Data
US 2023/0111048 A1    Apr. 13, 2023

Related U.S. Application Data

(60) Provisional application No. 62/984,888, filed on Mar. 4, 2020.

(51) Int. Cl.
*G06F 16/56* (2019.01)
*G06F 16/55* (2019.01)
*G06N 20/00* (2019.01)

(52) U.S. Cl.
CPC .............. *G06F 16/56* (2019.01); *G06F 16/55* (2019.01); *G06N 20/00* (2019.01)

(58) Field of Classification Search
CPC .......... G06F 16/55; G06F 16/56; G06N 20/00
See application file for complete search history.

(56) References Cited

U.S. PATENT DOCUMENTS

2020/0388071 A1* 12/2020 Grabner .................. G06T 17/20

FOREIGN PATENT DOCUMENTS

| WO | 2019203851 A1 | 10/2019 |
|---|---|---|
| WO | 2019213857 A1 | 11/2019 |

OTHER PUBLICATIONS

Sfikas, Konstantinos, Ioannis Pratikakis, and Theoharis Theoharis. "Ensemble of Panorama-based convolutional neural networks for 3D model classification and retrieval." Computers & Graphics 71 (2018): 208-218. (Year: 2018).*

(Continued)

*Primary Examiner* — William Spieler (57) ABSTRACT

System and method for differentiable networks trainable to learn an optimized query of a 3D model database used for object recognition includes training a first differentiable network configured as a differentiable renderer by generating 2D images from 3D models of a first object of a dissimilar second object while optimizing rendering parameters for producing 2D images by gradient descent of a first triple loss function. Visual variation among the images is maximized. A second differentiable network configured as a convolutional neural network defined by a regression function is trained by generating searchable feature vectors of the 2D images. The feature vectors are determined using optimized neural network parameters determined by gradient descent of a second triple loss function to achieve high correlation to an input image of the first object and low correlation to images of the second object.

12 Claims, 4 Drawing Sheets

(56) References Cited

OTHER PUBLICATIONS

Furuya, Takahiko, and Ryutarou Ohbuchi. "Deep aggregation of local 3d geometric features for 3d model retrieval." BMVC. vol. 7. 2016. (Year: 2016).*

Su, Hang, et al. "Multi-view convolutional neural networks for 3d shape recognition." Proceedings of the IEEE international conference on computer vision. 2015. (Year: 2015).*

Massa, Francisco Vitor Suzano. Relating images and 3D models with convolutional neural networks. Diss. Université Paris-Est, 2017. (Year: 2017).*

Ahmed, E. et al: A survey on Deep Learning Advances on Different 3D Data Representations, arxiv. org, Cornell University Library, 201 Olin Library Cornell University Ithaca, NY 14853, Aug. 4, 2018. pp. 1-20.

Ruthotto, Lars et al.: Deep Neural Networks Motivated by Partial Differential Equations, Journal of Mathematical Imaging and Vision, Kluwer Academic Publishers, NL, vol. 62, No. 3, Sep. 18, 2019, pp. 352-364.

International Search Report corresponding to application No. PCT/US2020/048309; 5 pages.

\* cited by examiner

TRAINING OF DIFFERENTIABLE RENDERER AND NEURAL NETWORK FOR QUERY OF 3D MODEL DATABASE

TECHNICAL FIELD

This application relates to machine learning applied to 3D virtual models supporting design and digital twins. More particularly, this application relates to training a differentiable renderer and neural network for improved querying of 3D models.

BACKGROUND

In industrial applications (e.g., design, manufacturing, digital twins), objects or system entities are modeled as 3D virtual representations (e.g., CAD models) to analyze 3D aspects of the objects (e.g., engineering analyses, simulation and testing, digital twins, product life management, design of new objects/systems, manufacturing by automation, systems performance, etc.). Access to such models requires queries to large database files stored in database repositories, the complexity, number and size of which have exploded in recent years, stretching the limits of efficient querying and processing capabilities for computer systems. To illustrate the magnitude of effort required, a 3D model of a complex object is represented as a long list (e.g., thousands) of 3D points and vectors representing faces of the object in 3D space. Thus, it can be appreciated how complicated a task it would be to compare a given 3D model to a known 3D model in a database archive seeking a suitable match, not even considering the added complexity of dissimilar viewpoints (rotation) of the pair of objects.

Hence, conventional approaches rely on visual analysis of 2D translations from 3D models when making the comparison. The task of querying 3D models based on visual similarity is still challenging, as it requires the ability to decompose 3D data into relevant 2D views and to properly compare these views. Existing solutions tackle the problem by generating a fixed set of views from a queried 3D model, then comparing features of these views with a database of features extracted from images of known 3D models rendered from the same viewpoints. A convolutional neural network (CNN) can be trained to extract meaningful and discriminative features from the views. The feature vectors representing known images can then be stored along with their labels (e.g., the class of the object they represent), so that the CNN can extract corresponding vectors of new images from a queried object and compare them with the stored ones for retrieval. The effectiveness of such methods depends on selections of pre-defined viewpoints and parameters (e.g., lighting) for rendering the 2D views of the 3D CAD modeled object. In practice, viewpoints for the rendered 2D views are usually chosen arbitrarily, e.g., by sampling equidistant positions in the 3D space around the target object. This selection does not consider the specificities of target objects (e.g., for an object that presents multiple symmetries, the system may be tricked into selecting the wrong symmetry among the choices).

Some solutions apply 3D to 3D comparisons, without an intermediate 2D rendering for comparison. Such an approach represents 3D models as meshes of vertices (i.e., their surface is decomposed into a large number of triangles in the 3D space). However, such representations cannot be easily compared since meshes of similar objects can have different resolutions, mesh element shapes, and/or different numbers of mesh elements and vertices.

SUMMARY

Method and system are disclosed for a pipeline of differentiable networks trained to learn an optimized database query for retrieval of 3D models used for object recognition. A particular improvement relates to training the differentiable network for automatic extraction of key features from a 3D model of a target object that can be used to query complex databases of virtual 3D models representing known objects and entities, with strong likelihood of matching to a known 3D model indexed by visually-based features. Instead of relying on manually-defined rendering parameters used to train the network to render the target object and extract features, the pipeline is designed for a comprehensive trainable solution that automatically regresses the best rendering parameters (e.g., viewpoints) to render 3D models to 2D renderings while also optimizing network parameters for extraction of distinctive features from the rendered images. Once pipeline is trained, the 3D model database of known objects can be indexed by the trained pipeline according to the distinctive features, enabling the pipeline to perform future object recognition operations on target objects with efficient query and retrieval of best matched 3D models.

In an aspect, a system of differentiable networks is trainable to learn an optimized database query for retrieval of 3D models used for object recognition. The system includes an end-to-end differentiable pipeline comprising a first differentiable network and a second differentiable network, the first differentiable network being configured as a differentiable renderer trained to generate a first set of 2D images from a first 3D model of a first object and a second set of 2D images from a second 3D model of a second object. The first set of 2D images are rendered according to optimized rendering parameters for producing 2D images determined by gradient descent of a first triple loss function with optimization (i) to maximize visual variation among N images generated for the first 3D model and (ii) to maximize visual dissimilarity between N images generated for the first model and N images generated for the second model. The second differentiable network is configured as a convolutional neural network defined by a regression function and trained to generate searchable features of the first set of 2D images, the features being configured as feature vectors extracted from the first set of 2D images according to optimized neural network parameters determined by gradient descent of a second triple loss function with optimization to achieve high correlation to an input image of the first set of 2D images and low correlation to images of the second set of 2D images.

In an aspect, a method for training a pipeline of differentiable networks to learn an optimized database query for retrieval of 3D models used for object recognition includes training a first differentiable network configured as a differentiable renderer by generating a first set of 2D images from a first 3D model of a first object and a second set of 2D images from a second 3D model of a second object, the first set of 2D images being rendered according to optimized rendering parameters for producing 2D images, the rendering parameters determined by gradient descent of a first triple loss function with optimization (i) to maximize visual variation among N images generated for the first 3D model and (ii) to maximize visual dissimilarity between N images generated for the first model and N images generated for the second model. The method also includes training a second differentiable network configured as a convolutional neural network defined by a regression function is trained by generating searchable features of the first set of 2D images, the features configured as feature vectors extracted from the first set of 2D images according to optimized neural network parameters determined by gradient descent of a second triple loss function with optimization to achieve high correlation to an input image of the first set of 2D images and low correlation to images of the second set of 2D images.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Access to 3D models stored in databases has become a more common task in many industrial environments. The following examples present a few of such particular instances. Designers and engineers of new objects and systems can use CAD software to draft and define a new object, may need to access existing CAD models as templates for components/parts (e.g., designing a new motor reusing existing/standard valves, screws, etc.). Existing CAD models of target objects can also be leveraged for virtual testing of a system design. In automated manufacturing environments, 3D models are also used more and more during the manufacturing of an object itself, such as for input to 3D printers or to provide robots with the information needed for them to manipulate the manufactured objects and their parts (e.g., most algorithms to teach robot how to grasp specific objects rely on the 3D models for their training).

When access to a 3D model database is required, there are instances when a 3D model of a target object is available and can be used for a query to the database to find a best match. The following are a few examples of such queries. In an industrial setting where an engineer or operator has a failed part or component that need replacement (e.g., spare part is required), but the part is not identifiable, such part can be scanned by a 3D scanner to obtain a rough 3D model of the object (e.g., using a smartphone scanning app). That model can then be used to query a database of labeled 3D models, in order to identify it. In other circumstances, a low-quality CAD model or 3D scan (e.g., noisy scan) is available for a target object, and a better quality 3D model having a more accurate and detailed version is available in a 3D model database, which can be queried to search and match to the low quality model. Comparison of 3D models may also arise to identify duplicate or counterfeit 3D models in a database. For example, 3D models representing the exact same object may have completely different structure (e.g., different sampling of the surface 3D points); hence a solution to compare models based on their appearance rather than exact point-based matching would be useful.

Methods and systems are disclosed for significant improvement in the efficiency and accuracy of query and retrieval of 3D models in archival databases using a novel feature decomposition of 3D renderings through a differentiable renderer, and feature extraction by a neural network to enable an indexed search of the database to find the best classification match. The disclosed framework solves the technical problem of intermediate 2D renderings having uncertainties with respect to proper viewpoints of objects with feature symmetries, which lead to retrieval of poorly matched 3D models from the archives. Instead of a traditional two-step approach composed of first rendering 2D views of a 3D model then processing these images into discriminative feature vectors for recognition, an end-to-end differentiable pipeline is trained to directly use a 3D model of an object to extract a set of discriminative feature vectors. From a 3D model of an object, a differentiable renderer generates sets of images to represent the object from various key viewpoints and with various key rendering parameters. The renderer optimizes rendering parameters and discriminative viewpoints to obtain image sets that best capture object geometry. A convolutional neural network (CNN) is jointly trained by performing a regression to determine a set of extracted feature vectors from the rendered images. These vectors are stored in a database of indexed feature vectors. After the pipeline is trained, it is enabled to perform an object recognition on a target object by extracting feature vectors of the target object and retrieving a 3D model from the database which is visually similar to the target object according to aggregated feature comparisons over the whole set of vectors.

Figure 1:
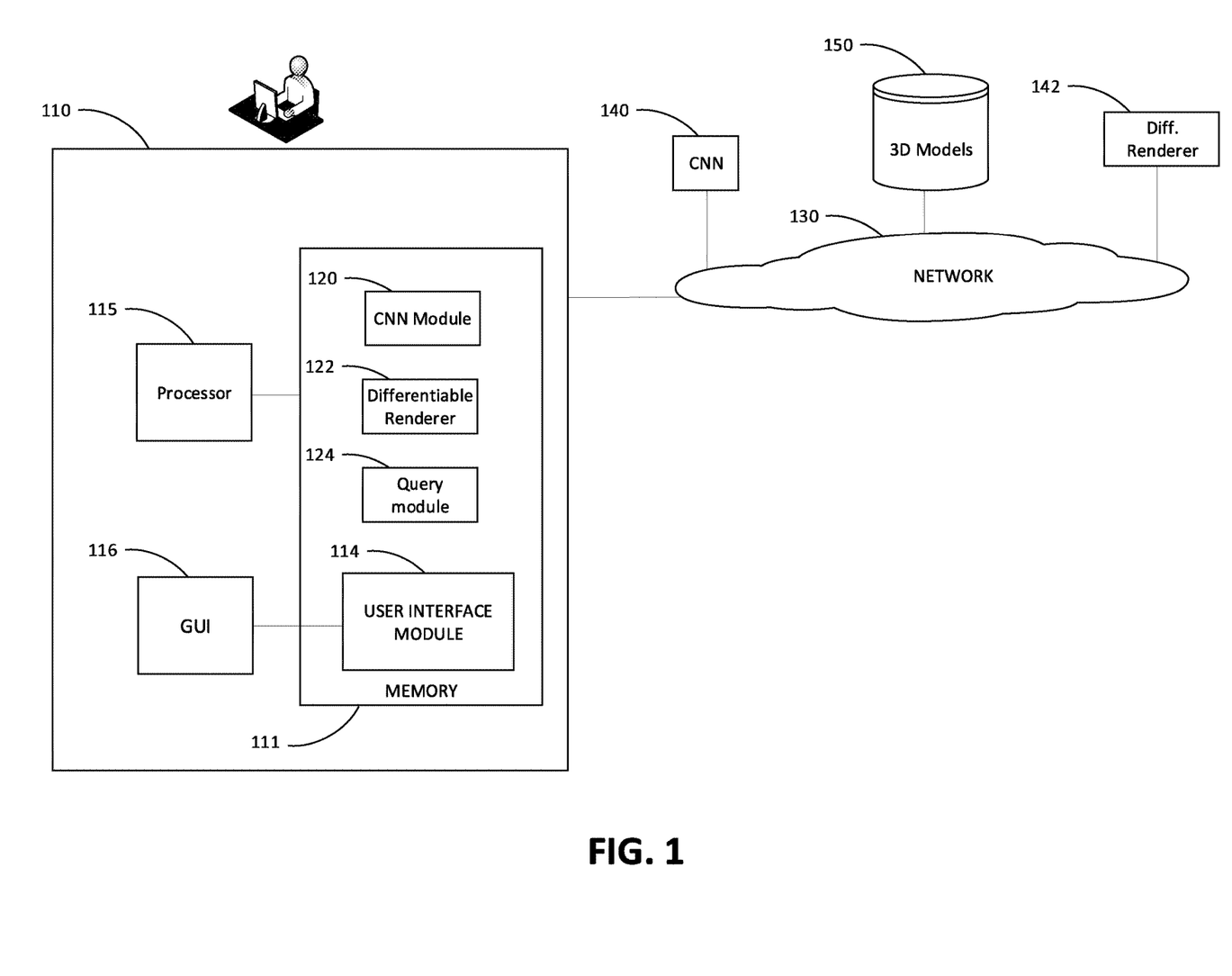
FIG. 1 shows an example of a system for object recognition using differentiable rendering to enhance 3D model retrieval in accordance with embodiments of this disclosure.

FIG. 1 shows an example of a system for object recognition using differentiable rendering to enhance 3D model retrieval in accordance with embodiments of this disclosure. In an embodiment, computer vision system includes a computing device 110, and a data repository of 3D models 150 interconnected by a network 130. The data repository may be configured as a database that stores, for each 3D model of an object, a virtual representation configured as a long list (e.g., thousands) of points and vectors representing faces of the object in 3D space. Computing device 110 includes a processor 115 and memory 111 (e.g., a non-transitory computer readable media) on which is stored various computer applications, modules or executable programs. CNN module 120 and differentiable renderer module 122 are trained together as a differentiable network pipeline that extracts features from 3D models. Query module 124 operates on extracted features from the trained pipeline and matches the features to a feature-based index linked to a data repository of 3D models for prediction of classification of a target object.

3D models for a target object to be identified may be selected by a user using GUI 116, whereby the selection is input as a path or as an upload. The 3D model of the target object can then be sent to a differentiable renderer 122 or cloud based differentiable renderer 142 as applicable. In an embodiment, the differentiable renderer is implemented locally as renderer 122. In another embodiment, the implementation used cloud based renderer 142. In another embodiment, renderer module 122 is implemented as a local client to interface with cloud based renderer 142. In an embodiment, local CNN module 120 is a stand alone CNN module operating locally on computing device 110. In another embodiment, the CNN is deployed as a cloud based CNN 140. In another embodiment, CNN module 120 is a local client used to interface with the cloud based CNN 140 for training and post training operations. Herein, the differentiable network formed by a differentiable renderer and a CNN will be described as a local deployment of renderer 122 and CNN 120, however, the configuration and operation as described also applies to alternative embodiments that involve renderer 142 and CNN 140. Training for the network formed by differentiable renderer 122 and CNN 120 is according to disclosed embodiments that enable more efficient and relevant retrieval of strongly matched 3D models for identifying a target object.

Network 130, such as a local area network (LAN), wide area network (WAN), or an internet based network, connects computing device 110 to a data repository of 3D models 150 to be indexed by the trained differentiable network for improved search and retrieval of 3D models during object recognition operations.

In an aspect of disclosed embodiments, a triplet loss function can be derived to train a differentiable pipeline formed by the differentiable renderer 122 and CNN 120. According to this approach, CNN 120 is trained to extract relevant features from an image x and encode them into a low-dimensional feature vector $z \in \mathcal{Z}$ with $\mathcal{Z} \subset \mathbb{R}^d$ in an embedding space of low-dimensionality d (e.g., mapping the images to a descriptor space where object instances are well separated). The feature vectors $z_s$ representing known images $x_s$ can then be stored along with their labels $y_s$ (i.e., the object class for the task of object retrieval), so that given a new image, the CNN 120 can be used to extract its corresponding vector and compare it with the stored ones for recognition.

Therefore, to learn discriminative features, a triplet loss function is applied to the training of the CNN 120, the CNN applying a regression function noted as $T_{\theta_T} \rightarrow z$, with $\theta_T$ representing trainable parameters of the CNN. A triplet is defined as $(x_b, x_+, x_-)$ with $x_b$ an input image, from the training dataset $X_s$, used as a binding anchor representing a specific class $c_b$ and viewpoint (e.g., defined by a quaternion $q_b$), $x_+$ a positive image similar to $x_b$ in terms of label (similar class $c_+ = c_b$ and/or pose $q_+ \approx q_b$), and $x_-$ a negative sample with dissimilar content (different class $c_-$ and pose $q_-$). The triplet loss function, denoted here as $\mathcal{L}_{tri}$, is designed to force the network to extract features similar for $x_b$ and $x_+$ and dissimilar for $x_b$ and $x_-$ according to the following expression:

$$\mathcal{L}_{tri}(\theta_T) = \sum\nolimits_{(x_b, x_+, x_-) \in X_s^3} \max\left(0, 1 - \frac{\|T_{\theta_T}(x_b) - T_{\theta_T}(x_-)\|_2^2}{\|T_{\theta_T}(x_b) - T_{\theta_T}(x_+)\|_2^2 + \epsilon}\right) \quad \text{Eq. (1)}$$

$$\text{where } \epsilon = \begin{cases} 2\arccos|q_b \cdot q_+| & \text{if } c_b = c_+ \\ n & \text{else, for } n > \pi \end{cases}$$

Here, $\epsilon$ is the margin setting the minimum ratio for the distance between similar and dissimilar pairs of samples. Once trained, the CNN regression function $T_{\theta_T}$ is used to compute the feature vectors of a subset of $X_s$. These vectors are then used as keys to index model labels, and to form a feature-descriptor database linked to the data repository of known 3D models 150. Recognition of unknown objects is done by using the trained network to compute the feature-descriptor of each rendered 3D model and then by applying a nearest-neighbor search algorithm to find its closest feature-descriptor in the database as an indicator of a best prediction for classification.

Figure 2:
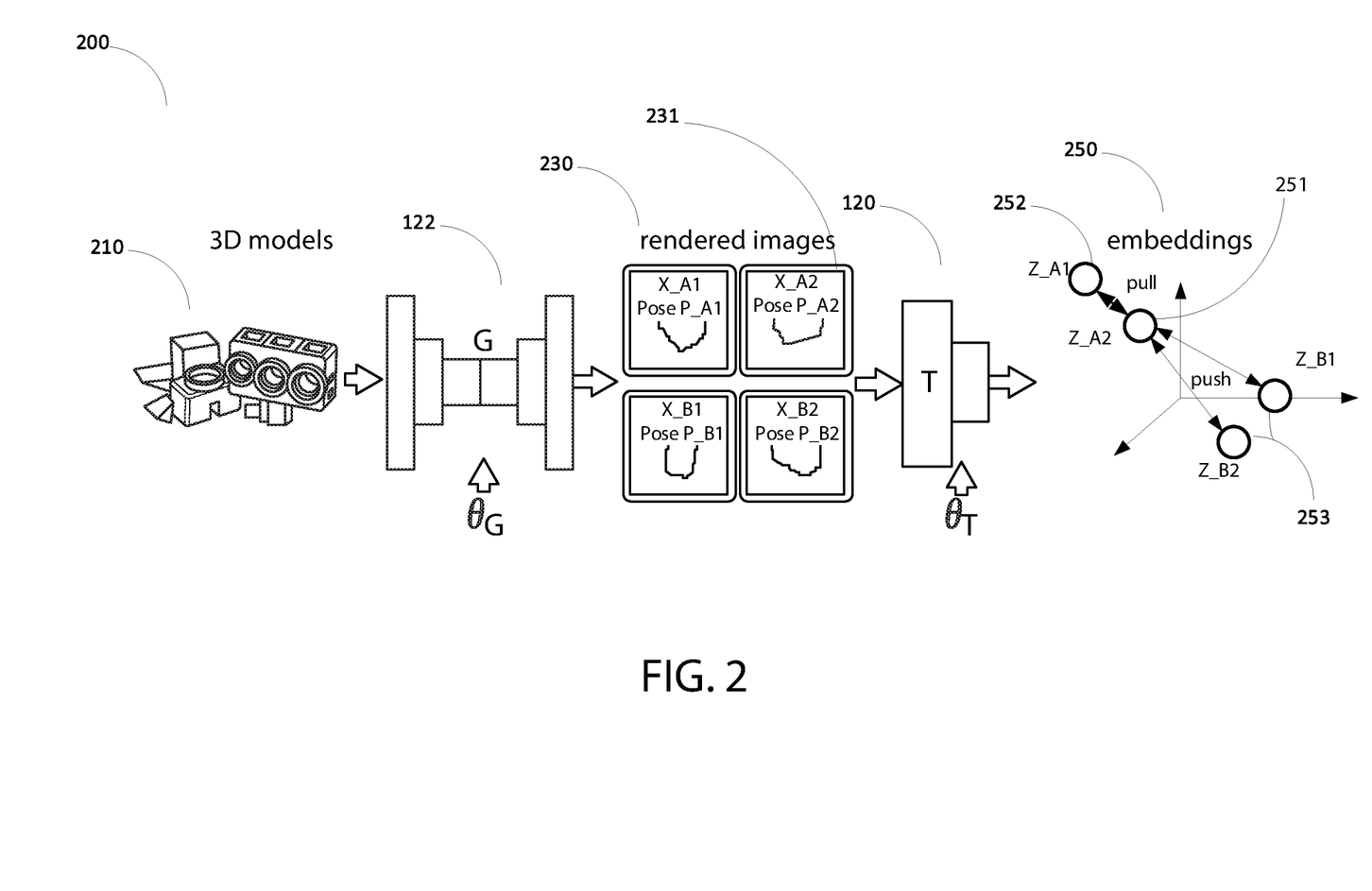
FIG. 2 shows an example of a differentiable network pipeline training operation that extracts differentiable feature vectors from 3D models in accordance with embodiments of this disclosure.

FIG. 2 shows an example of a differentiable network pipeline training operation that extracts differentiable feature vectors from 3D models in accordance with embodiments of this disclosure. Differentiable pipeline 200 includes a first network G for the differentiable renderer 122 and a second network T being a neural network for CNN 120. In an embodiment, pipeline 200 is trained using pairs of dissimilar models, rendering images 230 of each model in the pair, extracting feature vectors Z from the images according to a triple loss function that learns parameters for the differentiable networks G and T. Once trained, all archived 3D models of the database 150 are run through the pipeline 200 to generate an index for the entire database where each model is indexed according to feature vectors associated with each model.

In an embodiment, as shown by a training flowchart in FIG. 2, pipeline 200 receives 3D models 210 for rendering by differentiable renderer 122, returning a set of N rendered images 230 for each 3D model. For the simplistic example illustrated in FIG. 2, two images $x_{A1}$, $x_{A2}$ (N=2) are rendered for a first model $m_A$, the two images having different poses $P_{A1}$ and $P_{A2}$. Likewise, two images $x_{B1}$, $x_{B2}$ of a second model $m_B$ from a different class, are also rendered with two different poses $P_{B1}$ and $P_{B2}$. According to embodiments of this disclosure, the setting of N can be expanded to capture more poses (e.g., N=3 to 100). The functionality of differentiable renderer 122 can be represented as function $G_{\theta_G}$: $m \rightarrow X_m$, which takes a 3D model m as input, and returns a set of rendered images 230 such as N images $X_m = \{x_m^1, x_m^2, \ldots, x_m^N\}$ representing the object of class $c_m$ from various key viewpoints and with various key rendering parameters $\theta_G$ (lighting conditions, material properties, etc.). In an embodiment, differentiable renderer 122 includes a differentiable network (i.e., fully composed of differentiable operations) which updates rendering parameters $\theta_G$ by a gradient descent through backpropagation. An advantage of forming a pipeline with differentiable renderer 122 and CNN 120 (differentiable end-to-end) is that both can be trained together as a single trainable solution for optimizing the parameters (or weights) of the combined differentiable pipeline using gradient descent. CNN 120 can be represented by regression function $T_{\theta_T}: X_m \rightarrow Z_m$ which takes the rendered images 230, such as a set of N images $X_m$, and returns a set of features 250, such as N feature vectors $Z_m = \{z_m^1, z_m^2, \ldots, z_m^N\}$. An advantage of the feature vector representation is that distinctive characteristics of the object are captured (i.e., the extracted features have a high correlation to the input image and a low correlation to images of dissimilar objects), which enables improved searching and matching for the system at runtime. Another advantage of processing feature vectors is the compressed dimension of data representing the object. For example, an object may have a matrix representation of size 300×400, while the feature vector may be only 1×100. Note that the CNN 120 can either extract the feature vector, image by image, or it can extract them all at once with the possibility to aggregate information and pass information (e.g., batch normalization, attention mechanism, recurrent architecture, etc.) among the different vectors.

Figure 3:
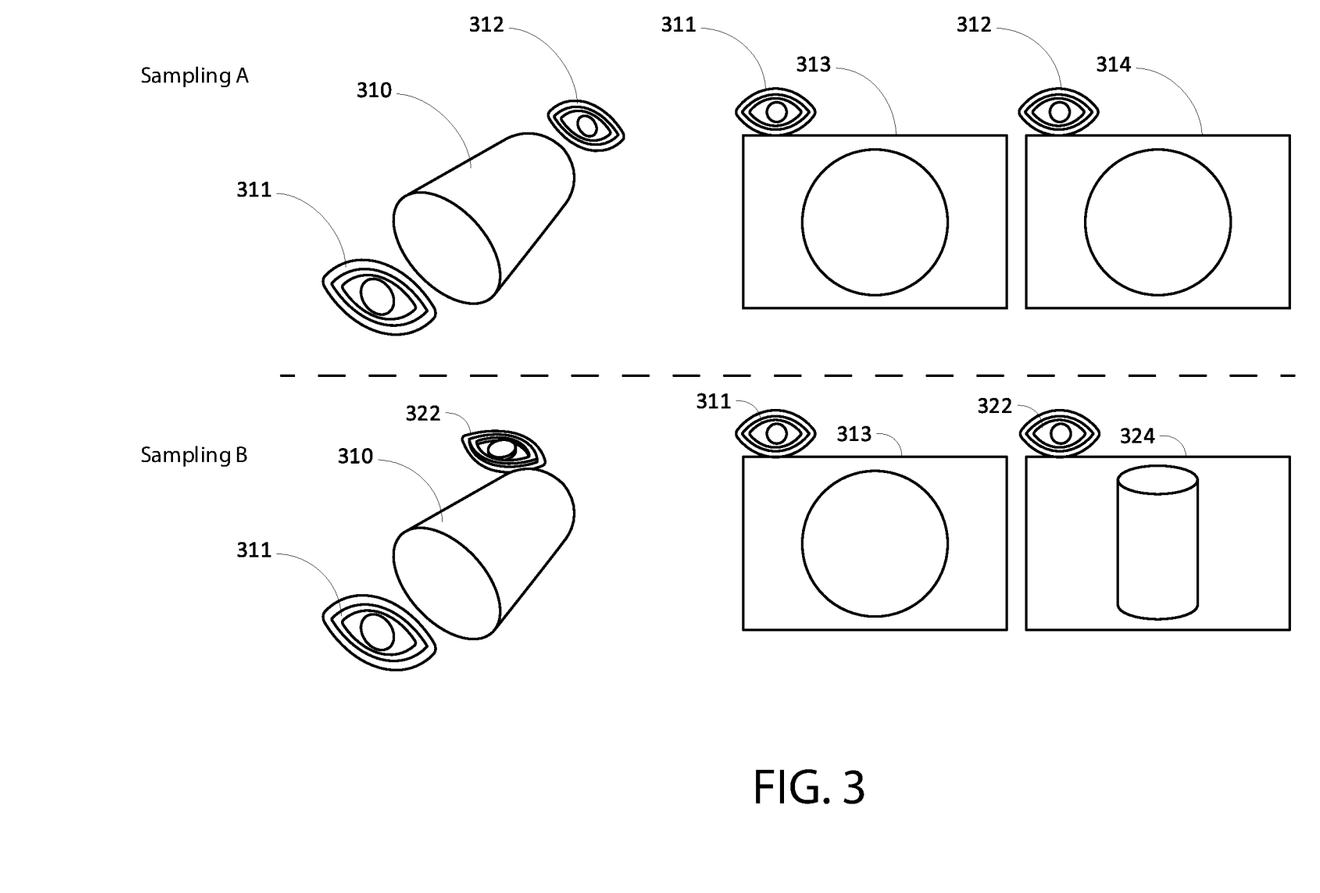
FIG. 3 shows an example viewpoint sampling to reduce uncertainties when rendering target objects according to embodiments of this disclosure.

The pipeline 200 is trained so that given a new 3D model $m_r$, relevant features $Z_{mr}$ are extracted and then compared with a feature database of known 3D models, to search for the most similar ones. In this pipeline training, an objective for the rendering module 122 is to extract 2D views of the 3D objects which are highly discriminative. For example, FIG. 3 illustrates the importance of smart viewpoint sampling for view-based 3D object retrieval. Suppose two rendered views are to represent a given 3D object. As shown in Sampling A, object 310 is rendered as image 313 from viewpoint 311, and image 322 from viewpoint 312. Here, the viewpoints are sampled poorly (i.e., both viewpoints 311 and 312 are located at a common axis of object 310, and the resulting images 313, 314 leave room for uncertainties (e.g., it would wrongly be assumed from the two images 313, 314 that they represent a spherical object). Using smart sampling methods, such as sampling B, where viewpoints 311 and 322 are more diverse than 311 and 312, a more explicit "shape description" in the form of image pair 313 and 324 is the result. With respect to parameters impacting the appearance of the object in a set of images, the same reasoning can be applied to other rendering parameters including, but not limited to, lighting conditions, material properties, camera parameters, etc. The renderer 122 is therefore trained to optimize its set of rendering parameters $\theta_G$ (i.e., the N different viewpoints, N lighting conditions, etc.) in order to obtain sets of images X which best capture the geometry and visual specificities of the objects (e.g., selecting viewpoints which are not facing symmetrical axes common in the 3D dataset, opting for various light conditions to cast different shadows and highlight different surface properties, etc.).

Returning to FIG. 2, a differentiable end-to-end training is now described for a generalized example in which N sample images are rendered. At each training iteration, two dissimilar objects are randomly selected from a pool of known and modeled objects from repository 150, and their respective 3D models $m_A$ and $m_B$ related to an object A and object B, respectively, are fed to the differentiable renderer 122. Given the current values of its rendering parameters $\theta_G$, the renderer 122 generates two sets of N images $X_A$ and $X_B$, where:

$X_A = \{x_A^1, x_A^2, \ldots, x_A^N\}$ and $X_B = \{X_B^1, x_B^2, \ldots, x_B^N\}$ (for their respective object).

These two sets of images are passed to the CNN 120, which respectively outputs feature vectors $Z_A$ and $Z_B$, where:

$Z_A = \{z_A^1, z_A^2, \ldots, z_A^N\}$ and $Z_B$ similarly defined.

The loss function of CNN 120 output layer computes a loss value that is then backpropagated through the pipeline to update the parameters $\theta_T$ and $\theta_G$ according to a gradient descent computation as follows. A triplet loss function for CNN 120 is derived by extending Eq. (1) to formulate a triplet loss function $\mathcal{L}_T$ that is dependent on both the renderer 122 and the CNN 120, has two sets of input images, and is applied to the training of the CNN 120, where a minimum loss is sought for the following function:

$$\mathcal{L}_T(\theta_T) = \Sigma_{(x_A^b \in X_A)} \Sigma_{(x_A^+ \in X_A, x_A^+ \neq x_A^b)}$$
$$\Sigma_{(x_B^- \in X_B)} \max\left(0, 1 - \frac{\|T_{\theta_T}(x_A^b) - T_{\theta_T}(x_B^-)\|_2^2}{\|T_{\theta_T}(x_A^b) - T_{\theta_T}(x_A^+)\|_2^2 + \epsilon}\right)$$

Eq. (2)

where $\epsilon = 2 \arccos|q_A \cdot q_B|$ with quaternion of a viewpoint, obtained from $\theta_G$.

Applying Eq. (2) to the setup in FIG. 2, the anchor image 231 corresponds to $x_A^b = x\_A2$, similar model image $x_A^+$ corresponds to image x_A1, and dissimilar image $x_B^-$ corresponds to images x_B1 or x_B2. The objective for loss function $\mathcal{L}_T$ is to maximize the similarity between the feature vectors of all the views of the same object (high correlation), while maximizing the dissimilarity with all the feature vectors from the different object (low correlation). In an embodiment, the loss can be made more symmetric by computing a second loss value while reversing the roles of models $m_A$ and $m_B$, performing a backpropagation for each of these triple loss values. For example, in Eq. (2), if models $m_A$ and $m_B$ are reversed, instead of image $x_A^+$ being the anchor image for comparisons, one of the images of set $X_B$ can represent the anchor. Computing a combination of both loss values makes the training more robust, because it constrains the network 200 to pull together the feature vectors only of the first model models $m_A$, but also of the second model $m_B$ at once. For additional robustness, additional loss values can be computed and backpropagated by allowing each of the four images to serve as the anchor, giving four loss values for N=2 as in the case shown in FIG. 2.

With loss function $\mathcal{L}_T$, the CNN 120 is trained to look through visual variations and to map different-looking images of the same model into similar feature vectors, while also ensuring that the feature vectors of images from different models are pushed well apart. The CNN 120 is tasked to learn the distinction between "different-looking images of the same model" and "images of different models", returning similar descriptors in the former case and dissimilar descriptors in the latter case. Loss function $\mathcal{L}_T$ of CN 120 is trained differently than that of the renderer 122, such that CNN 120 understands the appearance of each model and that different images actually contain similar features.

A different loss function is applied to function G of the renderer 122, with a goal being to render images highly dissimilar for different objects, but also as dissimilar as possible between images of the same object (e.g., using viewpoint disparity). In an aspect, the roles of the renderer 122 and the CNN 120 are adversarial, yet complementary. The set of rendered images capture the overall appearance of the model, while not representing the model from the same viewpoint but from meaningfully selected viewpoints that best highlight the appearance variations of models. The parameters of the renderer 122 (e.g., list of viewpoints, lighting conditions, etc.) should be optimized to maximize the visual variation within the set of images rendered from each object, to best capture the overall appearance of the object and not just a particular appearance, such as from one side.

The loss function $\mathcal{L}_G$ for renderer 122 is calculated according to the following relation:

$$\mathcal{L}_G(\theta_G) = \mathcal{L}_{diss}(G_{\theta_G}(m_A), G_{\theta_G}(m_B)) + \mathcal{L}_{diss},$$ Eq. (3)

$(G_{\theta_G}(m_A)) + \mathcal{L}_{diss}, (G_{\theta_G}(m_B))$ with $$\mathcal{L}_{diss}(X_A, X_B) =$$ Eq. (3a)
$$\Sigma_{(x_A \in X_A)} \Sigma_{(x_B \in X_B)} 1 - \frac{1}{\|T_{\theta_T}(x_A) - T_{\theta_T}(x_B)\|_2^2 + 1e^{-6}}$$ and $$\mathcal{L}_{diss'}(X) =$$ Eq. (3b)
$$\sum_{(x_P \in X)} \sum_{(x_Q \in X, x_Q \neq x_P)} 1 - \frac{1}{\|T_{\theta_T}(x_P) - T_{\theta_T}(x_Q)\|_2^2 + 1e^{-6}}$$

The function $\mathcal{L}_{diss}$, is defined to optimize G to maximize visual variation among the N images that it generates from each model (i.e., maximally dissimilar) (e.g., to achieve the situation illustrated in Sampling B of FIG. 3). Additionally, the function $\mathcal{L}_{diss}$ is defined to optimize the function G to maximize visual dissimilarity between N images of model A and N images of model B. The triple loss function $\mathcal{L}_G$ of Eq. 3 relies on regression function $T_{\theta T}$ of CNN 120 (Eq. 3a, 3b) for the reason that a strong distance metric is needed to compare images, which is actually what $T_{\theta T}$ is trained for since it is optimized to extract semantically-rich features from the images, looking beyond pixelwise values. By computing the distance between the feature vectors extracted by $T_{\theta T}$ rather than directly between the images, the renderer 122 can generate images that are semantically dissimilar rather than just pixel-wise different. In an aspect, while $T_{\theta T}$ is used to compute the loss for the function $G_{\theta G}$ of renderer 122, parameters for $T_{\theta T}$ are frozen while training the function $G_{\theta G}$ (i.e., frozen parameters for $T_{\theta T}$ are not impacted by the result of this loss computation).

Embeddings 250 represent the feature vectors Z derived by CNN 120 for each of the four rendered images 230 in an embedding space (a lower-dimensional space) represented in FIG. 2 as a space with three dimensions (the feature vectors in this example have three dimensions for illustrative purposes), therefore each vector can be represented as a point in 3D space. The dimension scale represents the number of features or characteristics being represented. For real world applications, however, such features could number much greater than three. Feature vectors 251, 252 are associated with the rendered images of model $m_A$ similar to the target model; feature vectors 253 are associated with the rendered images of model $m_B$, being dissimilar to the target model. As demonstrated, the training objective is to derive network parameters that pull similar feature vectors close in embedding space, while pushing feature vectors for a dissimilar model further away. For example, one feature vector can represent an anchor vector, such as feature vector 251 for being associated with the anchor image 231 of the four image inputs 230, against which the other vectors are compared. The pull/push distances are the consequences of the triplet loss function described above. The triple loss function is formulated to pull together the feature vectors of semantically-similar images 251, 252 (i.e., it forces the CNN 120 to extract feature vectors that are close to one to another to minimize the denominator in the triple loss equation). The triple loss formulation also pushes apart the feature vectors 253 of dissimilar samples away from anchor feature vector 251. Backpropagating this triplet loss in the pipeline basically teaches the network parameters to pull together the features of similar content and to push apart the features of dissimilar ones.

Following the training phase for the pipeline 200, the known 3D models are fed through the trained pipeline, and for each known 3D model, feature vectors are extracted and then used as keys to generate an index for the model labels (e.g., $m_A$, $m_B$) with feature-descriptors and to form a feature-descriptor database linked to the data repository of known 3D models 150.

In an inference-based prediction process, the trained pipeline 200 is used to retrieve 3D models from a known database which are visually similar to a given 3D model. As previously described, the new 3D model may pertain to a new unknown object, where the 3D model may be obtained from a 3D scan of the new object. Another instance of a new 3D model requiring a database query could include a coarse 3D model needing replacement by a more detailed and accurate model. Given the new 3D model, the trained pipeline is used to obtain a set of feature vectors Z for the new 3D model corresponding to the N images rendered for the model. Each vector in Z can be compared to the feature-descriptors of the feature-descriptor database linked to data repository of known 3D models 150. The prediction may be achieved using query module 124 by aggregating the results over the whole set (e.g., by counting the object classes the most present among nearest neighbors), which identifies the most similar 3D model in the database. For example, for each of the N feature vectors, query module 124 queries the database with the feature vector to find the nearest neighbors, retrieving nearest neighbors and corresponding label (e.g., a model ID, such as $m_A$). All the results from the database may be aggregated by query module 124 to return the most similar model ID as the prediction for the classification, such as the model that appears most frequently in the results of N queries.

Figure 4:
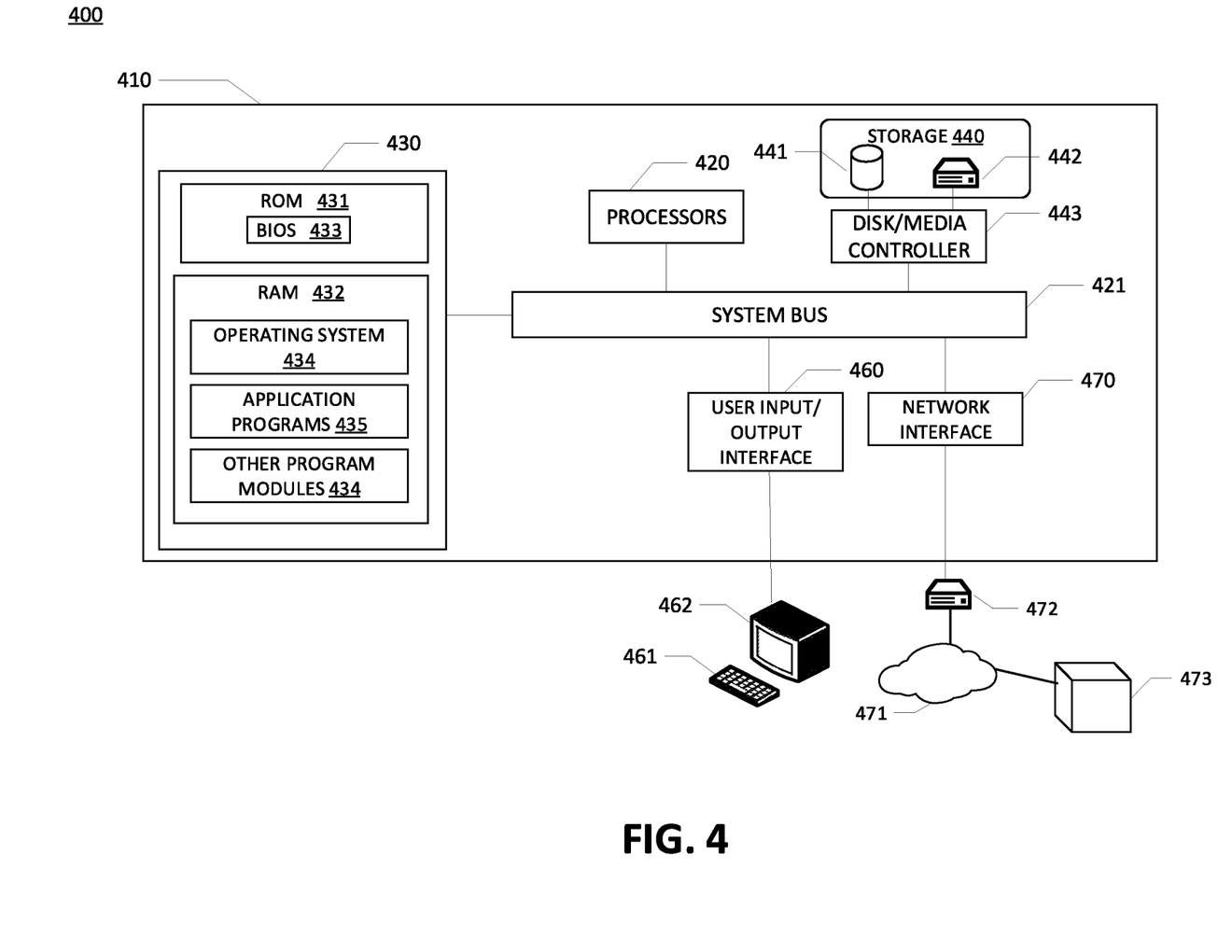
FIG. 4 illustrates an example of a computing environment within which embodiments of the disclosure may be implemented.

FIG. 4 illustrates an example of a computing environment within which embodiments of the present disclosure may be implemented. A computing environment 400 includes a computer system 410 that may include a communication mechanism such as a system bus 421 or other communication mechanism for communicating information within the computer system 410. The computer system 410 further includes one or more processors 420 coupled with the system bus 421 for processing the information. In an embodiment, computing environment 400 corresponds to system for performing the above described embodiments, in which the computer system 410 relates to a computer described below in greater detail.

The processors 420 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 420 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 421 may include at least one of a system bus, a memory bus, an address bus, or a message bus, and may permit exchange of information (e.g., data (including computer-executable code), signaling, etc.) between various components of the computer system 410. The system bus 421 may include, without limitation, a memory bus or a memory controller, a peripheral bus, an accelerated graphics port, and so forth. The system bus 421 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 410 may also include a system memory 430 coupled to the system bus 421 for storing information and instructions to be executed by processors 420. The system memory 430 may include computer readable storage media in the form of volatile and/or nonvolatile memory, such as read only memory (ROM) 431 and/or random access memory (RAM) 432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 may additionally include, for example, operating system 434, application modules 435, and other program modules 436. Application modules 435 may include aforementioned modules described for FIG. 1 and may also include a user portal for development of the application program, allowing input parameters to be entered and modified as necessary.

The operating system 434 may be loaded into the memory 430 and may provide an interface between other application software executing on the computer system 410 and hardware resources of the computer system 410. More specifically, the operating system 434 may include a set of computer-executable instructions for managing hardware resources of the computer system 410 and for providing common services to other application programs (e.g., managing memory allocation among various application programs). In certain example embodiments, the operating system 434 may control execution of one or more of the program modules depicted as being stored in the data storage 440. The operating system 434 may include any operating system now known or which may be developed in the future including, but not limited to, any server operating system, any mainframe operating system, or any other proprietary or non-proprietary operating system.

The computer system 410 may also include a disk/media controller 443 coupled to the system bus 421 to control one or more storage devices for storing information and instructions, such as a magnetic hard disk 441 and/or a removable media drive 442 (e.g., floppy disk drive, compact disc drive, tape drive, flash drive, and/or solid state drive). Storage devices 440 may be added to the computer system 410 using an appropriate device interface (e.g., a small computer system interface (SCSI), integrated device electronics (IDE), Universal Serial Bus (USB), or FireWire). Storage devices 441, 442 may be external to the computer system 410.

The computer system 410 may include a user input/output interface module 460 to process user inputs from user input devices 461, which may comprise one or more devices such as a keyboard, touchscreen, tablet and/or a pointing device, for interacting with a computer user and providing information to the processors 420. User interface module 460 also processes system outputs to user display devices 462, (e.g., via an interactive GUI display).

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium of storage 440, such as the magnetic hard disk 441 or the removable media drive 442. The magnetic hard disk 441 and/or removable media drive 442 may contain one or more data stores and data files used by embodiments of the present disclosure. The data store 440 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 400 may further include the computer system 410 operating in a networked environment using logical connections to one or more remote computers, such as remote computing device 473. The network interface 470 may enable communication, for example, with other remote devices 473 or systems and/or the storage devices 441, 442 via the network 471. Remote computing device 473 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 473). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

It should be appreciated that the program modules, applications, computer-executable instructions, code, or the like depicted in FIG. 4 as being stored in the system memory 430 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 410, the remote device 473, and/or hosted on other computing device(s) accessible via one or more of the network(s) 471, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computer system 410 may include alternate and/or additional hardware, software, or firmware components beyond those described or depicted without departing from the scope of the disclosure. More particularly, it should be appreciated that software, firmware, or hardware components depicted as forming part of the computer system 410 are merely illustrative and that some components may not be present or additional components may be provided in various embodiments. While various illustrative program modules have been depicted and described as software modules stored in system memory 430, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system of differentiable networks trainable to learn an optimized query of a 3D model database used for object recognition, the system comprising:
    a processor; and
    a non-transitory memory having stored thereon modules executed by the processor, the modules comprising:
    a database of a virtual representation data for a plurality 3D models of objects, the data configured as a list of points and vectors representing faces of the objects in 3D space;
    an end-to-end differentiable pipeline comprising a first differentiable network and a second differentiable network,
    wherein the first differentiable network is configured as a differentiable renderer to be trained to generate a first set of 2D images from a first 3D model of a first object and a second set of 2D images from a second 3D model of a second object, the first set of 2D images being rendered according to optimized rendering parameters for producing 2D images, the rendering parameters determined by gradient descent of a first triple loss function with optimization (i) to maximize visual variation among N images generated for the first 3D model and (ii)) to maximize visual dissimilarity between N images generated for the first model and N images generated for the second model; and
    wherein the second differentiable network is configured as a convolutional neural network defined by a regression function and to be trained to generate searchable features of the first set of 2D images, the features configured as feature vectors extracted from the first set of 2D images according to optimized neural network parameters determined by gradient descent of a second triple loss function with optimization to achieve high correlation to an input image of the first set of 2D images and low correlation to images of the second set of 2D images.

2. The system of claim 1, wherein the first triple loss function relies on the distance between the feature vectors extracted by the second triple loss function.

3. The system of claim 1, wherein the first triple loss function relies on a computed distance between feature vectors extracted by the second triple loss function.

4. The system of claim 1, wherein the first triple loss function is optimized to capture the overall appearance of the first object and the second object by representing meaningfully selected viewpoints according to appearance variations.

5. The system of claim 1, further comprising a data repository of known 3D models, wherein following training, the trained pipeline is used to receive each known 3D model, determine feature vectors associated with each known 3D model, and generate an index for model labels of the known 3D models with feature-descriptors to form a feature-descriptor database linked to the data repository of known 3D models.

6. The system of claim 5, wherein the trained pipeline is configured to receive a new 3D model of an unknown target object, and to generate feature vectors the new 3D model;
    the system further comprising:
    a query module configured to:
    compare each of the feature vectors to the in feature-descriptors of the feature-descriptor database;
    find nearest neighbors of feature-descriptors,
    retrieve nearest neighbors and corresponding model labels, and
    return a prediction for the classification of the unknown target object corresponding to the model label for one of the nearest neighbors.

7. A method for training a pipeline of differentiable networks to learn an optimized query of a 3D model database used for object recognition, the method comprising:
    training a first differentiable network configured as a differentiable renderer by generating a first set of 2D images from a first 3D model of a first object and a second set of 2D images from a second 3D model of a second object, the first set of 2D images being rendered according to optimized rendering parameters for producing 2D images, the rendering parameters determined by gradient descent of a first triple loss function with optimization (i) to maximize visual variation among N images generated for the first 3D model and (ii)) to maximize visual dissimilarity between N images generated for the first model and N images generated for the second model; and
    training a second differentiable network configured as a convolutional neural network defined by a regression function by generating searchable features of the first set of 2D images, the features configured as feature vectors extracted from the first set of 2D images according to optimized neural network parameters determined by gradient descent of a second triple loss function with optimization to achieve high correlation to an input image of the first set of 2D images and low correlation to images of the second set of 2D images.

8. The method of claim 7, wherein the first triple loss function relies on the distance between the feature vectors extracted by the second triple loss function.

9. The method of claim 7, wherein the first triple loss function relies on a computed distance between feature vectors extracted by the second triple loss function.

10. The method of claim 7, wherein the first triple loss function is optimized to capture the overall appearance of the first object and the second object by representing meaningfully selected viewpoints according to appearance variations.

11. The method of claim 7, further comprising:
following training, using the trained pipeline to receive each known 3D model, determine feature vectors associated with each known 3D model, and generate an index for model labels of the known 3D models with feature-descriptors to form a feature-descriptor database linked to the data repository of known 3D models.

12. The method of claim 11, further comprising:
receiving, by the trained pipeline, a new 3D model of an unknown target object;
generating feature vectors the new 3D model;
comparing each of the feature vectors to the feature-descriptors of the feature-descriptor database;
finding nearest neighbors of feature-descriptors;
retrieving nearest neighbors and corresponding model labels; and
returning a prediction for the classification of the unknown target object corresponding to the model label for one of the nearest neighbors.

* * * * *